United States Patent
Ludwig et al.

(10) Patent No.: US 9,992,288 B2
(45) Date of Patent: Jun. 5, 2018

(54) METHOD AND DEVICE FOR AN ADAPTIVE HANDLING OF DATA TRAFFIC

(71) Applicant: Telefonaktiebolaget L M Ericsson (Publ), Stockholm (SE)

(72) Inventors: Reiner Ludwig, Hürtgenwald (DE); Pablo Molinero Fernandez, Madrid (ES); Araceli Calle, Newbury (GB)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 112 days.

(21) Appl. No.: 14/649,174

(22) PCT Filed: Dec. 4, 2012

(86) PCT No.: PCT/EP2012/074372
§ 371 (c)(1),
(2) Date: Jun. 2, 2015

(87) PCT Pub. No.: WO2014/086398
PCT Pub. Date: Jun. 12, 2014

(65) Prior Publication Data
US 2015/0350343 A1 Dec. 3, 2015

(51) Int. Cl.
*G06F 15/173* (2006.01)
*H04L 29/08* (2006.01)
(Continued)

(52) U.S. Cl.
CPC .......... *H04L 67/16* (2013.01); *H04L 41/0893* (2013.01); *H04L 61/1511* (2013.01);
(Continued)

(58) Field of Classification Search
None
See application file for complete search history.

(56) References Cited

U.S. PATENT DOCUMENTS 9,231,903 B2 * 1/2016 Seastrom ............ H04L 61/1511
2002/0087707 A1 7/2002 Stewart et al.
(Continued)

FOREIGN PATENT DOCUMENTS

WO WO 2007/016472 A2 2/2007

OTHER PUBLICATIONS

International Search Report and Written Opinion of the International Searching Authority, PCT Application No. PCT/EP2012/074372, dated Sep. 4, 2013.
(Continued)

*Primary Examiner* — Joshua Joo
(74) *Attorney, Agent, or Firm* — Sage Patent Group

(57) ABSTRACT

A method in a communications network for adaptive handling of network data traffic between a user equipment and a network resource, said data traffic being enabled by a lookup procedure for obtaining a network address of the network resource. The user equipment sends to a server a request for accessing said data traffic. The server obtains access information related to a connection of the user equipment to the communications network and sends a further request to a lookup adaptation server. The source address of the further request is based on the access information. Based on the source address of the further request, the lookup adaptation server returns to the user equipment a network address of the network resource capable of handling the data traffic.

10 Claims, 4 Drawing Sheets

(51) Int. Cl.
*H04L 29/12* (2006.01)
*H04L 12/24* (2006.01)
*H04L 29/06* (2006.01)
*H04W 12/08* (2009.01)

(52) U.S. Cl.
CPC .......... *H04L 67/02* (2013.01); *H04L 61/6054* (2013.01); *H04L 63/0227* (2013.01); *H04W 12/08* (2013.01)

(56) References Cited

U.S. PATENT DOCUMENTS

| | | | |
|---|---|---|---|
| 2007/0214256 A1* | 9/2007 | Castaneda | H04L 67/025 709/224 |
| 2009/0304015 A1* | 12/2009 | Willars | H04L 12/5695 370/412 |
| 2010/0121979 A1 | 5/2010 | St Pierre | |
| 2013/0111066 A1 | 5/2013 | Vempati et al. | |
| 2014/0304386 A1* | 10/2014 | Lyon | H04L 41/00 709/223 |
| 2015/0271709 A1* | 9/2015 | Rune | H04W 28/24 370/329 |

OTHER PUBLICATIONS

Richardson, "Secret Gardens are Better than Walled Gardens draft-richardson-homenet-secret-gardens-00", Internet Engineering Task Force, Network Working Group, Internet-Draft, Intended Status: Informational, Expires May 10, 2013, Nov. 6, 2012, 15 pp.

* cited by examiner

US 9,992,288 B2

METHOD AND DEVICE FOR AN ADAPTIVE HANDLING OF DATA TRAFFIC

CROSS REFERENCE TO RELATED APPLICATION

This application is a 35 U.S.C. § 371 national stage application of PCT International Application No. PCT/EP2012/074372, filed on 4 Dec. 2012, the disclosure and content of which is incorporated by reference herein in its entirety. The above-referenced PCT International Application was published in the English language as International Publication No. WO 2014/086398 A1 on 12 Jun. 2014.

TECHNICAL FIELD

The present invention relates to a method for a network address lookup procedure for handling of data traffic and to corresponding devices.

BACKGROUND

In communication networks, adaptive handling of data traffic may be used to distinguish between different classes of data traffic. For example, a forwarding treatment of data packets, i.e., the way of forwarding a data packet on the way towards its destination, may be controlled to provide a certain Quality of Service (QoS) level, which depends on the traffic class.

For example, in mobile communication networks data traffic related to a specific service may be directed to a bearer offering a certain QoS level. In this respect, a bearer is considered to be an information transmission context or path of defined characteristics, e.g., capacity, delay, and/or bit error rate. Typically, a number of bearers will be established between a gateway of a mobile communication network and a user equipment (UE), e.g., a mobile phone or other type of mobile terminal. A bearer may carry downlink (DL) data traffic in a direction from the network to the UE, and may carry data traffic in an uplink (UL) direction from the UE to the network. In the gateway and in the UE the data traffic, which includes a plurality of IP data packets (IP: "Internet Protocol", which can be the IP Version 4, also referred to as IPv4, or the IP Version 6, also referred to as IPv6) can be filtered, e.g., using IP 5-tuple packet filters, thereby directing the IP data packets to a desired bearer. According to the 3GPP (Third Generation Partnership Project) Technical Specifications (TSs) 23.060 and 24.301, a set of packet filters used to direct the data traffic to a certain bearer.

Further, it is also desirable to apply adaptive handling to data traffic related to specific network resources. For example, data traffic related to a certain network resource, e.g., to a certain internet service or to a certain content provider, may be known to require a specific QoS level. However, it may in some cases be hard to decide on the basis of the data traffic itself which handling is required. On the other hand, adaptive handling could also be implemented on the basis of known network addresses used by these specific network resources. In this case, however, problems may arise if a large number of specific network resources need to be covered, which in turn may use a variety of different network addresses. Therefore rather complex traffic classification rules would need to be defined in order to take into account a large number of arbitrary network addresses. This may specifically be problematic when considering that in some communication network environments there exist limits on the complexity of the traffic classification rules. For example, the 3GPP TSs limit the maximum number of packet filters which can be installed in a TFT of the UE.

Accordingly, there is a need for techniques which allow for efficient adaptive handling of network traffic related to a specific network resource.

SUMMARY

According to an embodiment of the invention, a method for adaptive handling of network data traffic between a user equipment and a network resource (80) in a communications network is provided. The data traffic is enabled by a lookup procedure for obtaining a network address of the network resource. The user equipment sends a request for accessing data traffic to a server. The server obtains access information related to a connection of the user equipment to the communications network and further sends a request to a lookup adaptation server. The source address of the further request is based on the access information. Based on the source address of the further request, the lookup adaptation server returns to the user equipment a network address of the network resource capable of handling the data traffic.

According to a further embodiment of the invention, a network device is provided for adaptive handling of network data traffic between a user equipment and a network resource, in a communications network. The device comprises an interface for receiving a request for accessing data traffic. The device also comprises a processor which is adapted to access information related to a connection of the user equipment to the communications network and send another request to a lookup adaptation server, the source address of the further request being based on the access information. The processor is also adapted to receive by the lookup adaptation server a network address of the network resource capable of handling the data traffic, based on the source address of the further request.

According to a yet further embodiment of the invention, a computer program product is provided. The computer program product includes program code to be executed by a processor of a network device. By executing the program code, the network device is caused to operate according to one or more of the above methods.

According to further embodiments, other methods, devices, or computer program products for implementing the methods may be provided.

DETAILED DESCRIPTION OF EMBODIMENTS

Figure 1:
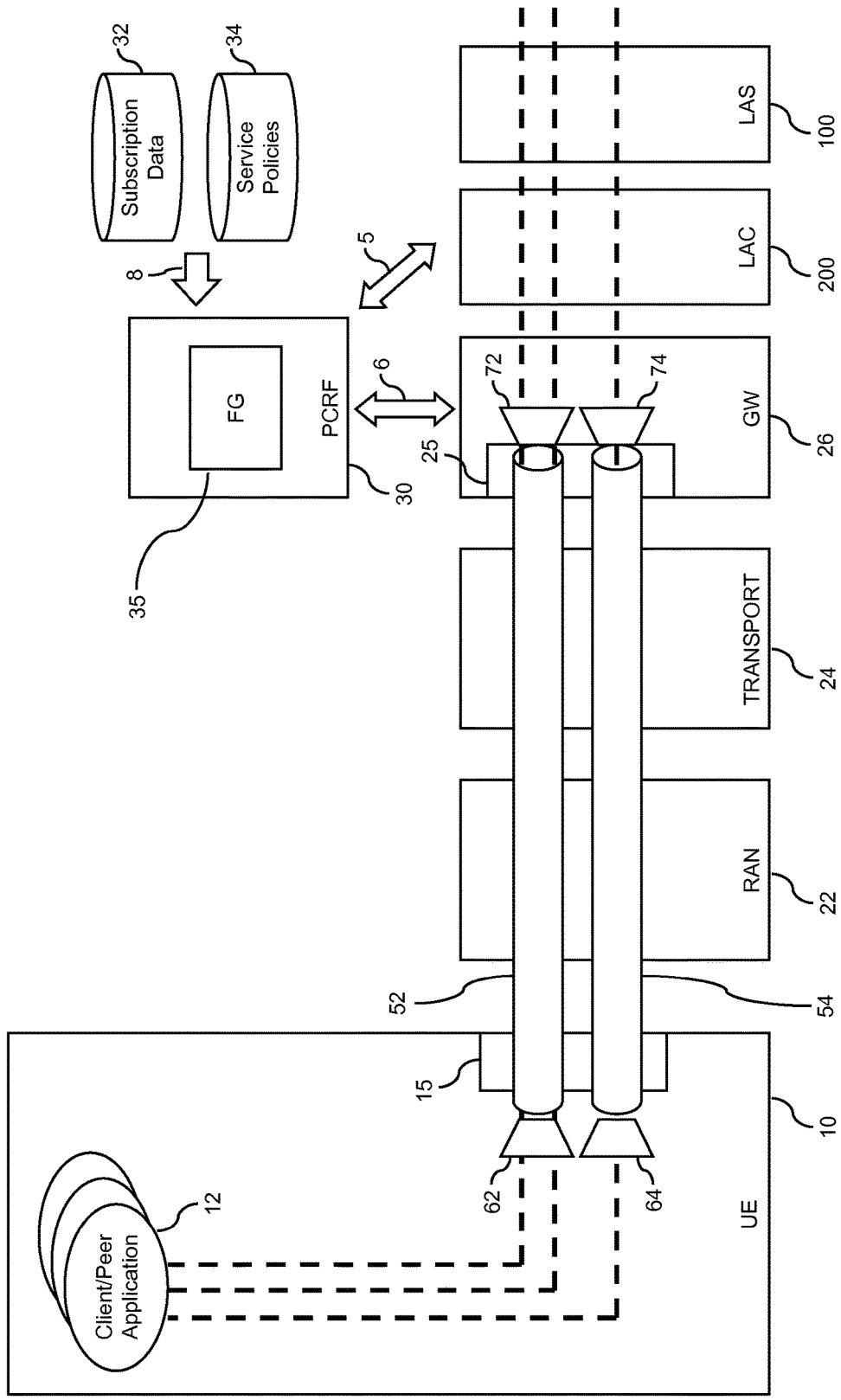
FIG. 1 schematically illustrates a mobile network environment in which concepts according to embodiments of the invention are implemented.

In the following, the invention will be explained in more detail by referring to exemplary embodiments and to the accompanying drawings. The illustrated embodiments relate to concepts for adaptive handling of mobile network traffic. As illustrated in FIG. 1, the concepts are applied in a mobile network according to the 3GPP TSs. However, it is to be understood that the illustrated concepts may be applied in other types of mobile network as well, e.g., using other types of radio access technology.

FIG. 1 schematically illustrates a mobile network environment in which concepts according to embodiments of the invention the invention can be applied.

The communication network environment includes a UE 10, which may also be referred to as a terminal, and a number of network components 22, 24, 26, 30. Among these network components there is a Radio Access Network (RAN) 22. The RAN 22 is based on a certain type or certain types of radio access technology (RAT), e.g., GSM (Global System for Mobile Communications), EDGE (Enhanced Data Rate for GSM Evolution), UMTS (Universal Mobile Telecommunications System), Wideband Code Division Multiple Access (WCDMA), or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services to one or more external packet data networks. The gateway 26 may also be a Packet Data Network Gateway (PDN GW).

In addition, the mobile communication network includes a policy controller 30, which is implemented as a Policy and Charging Rules Function (PCRF) according to the 3GPP TSs. The policy controller 30 may be implemented by dedicated hardware and/or comprise software functions executed by a processor. The gateway 26 and the policy controller 30 are typically regarded as components of a core network. The policy controller 30 communicates with the gateway 26 via a signaling path 6, which may be implemented using the Gx interface according to the 3GPP TSs. The policy controller 30 may be further coupled to a subscriber database 32, e.g., a Home Location Register (HLR) or a Home Subscriber server (HSS) according to the 3GPP TSs, and to a service policy database 34 via a signaling path 8, e.g., implemented using a Sp interface according to the 3GPP TSs. The policy controller 30 may thus receive policy data relating to a specific user and/or relating to a specific service available in the mobile communication network, e.g., mobile TV. The policy controller 30 may further communicate with other network functions using a control signaling path 5, which may be implemented using the Rx interface according to the 3GPP TSs.

Among other functions, the policy controller 30 may comprise a filter generator 35. The filter generator 35 is adapted to specify packet filters to be used in the UE 10 and the gateway 26, which may be accomplished on the basis of subscription data from the subscription database 32, service policies from the service policy database 34, and control data received via the signaling path 5. The packet filters are an example of packet classification rules, which in the illustrated example are used to provide different QoS service levels depending on the traffic class.

As further illustrated, data traffic between the network and the UE 10 is carried by a number of bearers 52, 54 established across a radio interface between the UE 10 and the RAN 22. The data traffic typically pertains to one or more client/peer applications 12 running on the UE 10, and may be related to certain network resources, e.g., internet services or content providers. The bearers 52, 54 are established between the UE 10 and the gateway 26. The bearers 52, 54 carry data traffic in both the DL and the UL direction, i.e., may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided with a corresponding interface 25 which allows for receiving incoming data packets from the bearers 52, 54 and sending outgoing data packets on the bearers 52, 54. The bearers 52, 54 may include a default bearer 52 generally established for offering packet-based services to the UE 10 and one or more dedicated bearer 54 which may have different QoS level, e.g., a higher or lower QoS level, than the default bearer. The default bearer 52 is typically established when the UE 10 attaches to the gateway 26 and receives its IP address and IP connectivity. The dedicated bearer 54 is typically established on demand, e.g., when data packets requiring a certain QoS level need to transmitted. However, in some embodiments dedicated bearers may also established in advance, e.g., when the UE 10 attaches to the gateway 26. Each bearer 52, 54 may be associated with a corresponding QoS profile. The QoS profile may be defined through parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR).

Accordingly, a certain QoS level may be provided for communicating data packets between the UE 10 and the gateway 26 by assigning the data packets to a corresponding one of the bearers 52, 54.

In the UE 10, the data packets are routed to a desired bearer 52, 54 using correspondingly configured packet classification rules in the form of UL packet filters 62, 64. In the gateway 26, the data packets are routed to the desired bearers 52, 54 using correspondingly configured packet classification rules in the form of DL packet filters 72, 74. In accordance with the illustrated 3GPP scenario, a set of filters 62, 64, 72, 74 which operates to direct the data packets to a corresponding bearer may also be referred to as a TFT. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 via the signaling path 6. As regards the UL packet filters 62, 64 used in the UE 10, these may be signaled from the policy controller 30 via the gateway 26 to the UE 10. In some embodiments, at least some of the UL packet filters 62, 64 may be preconfigured in the UE 10 and/or some of the DL packet filters 72, 74 may be preconfigured in the gateway 26. Also, in some embodiments the UL packet filters could be preconfigured in the gateway 26 and be signaled to the UE 10 when it attaches to the gateway 26 or when the corresponding bearer 52, 54 is established. In such embodiments using preconfigured packet filters in the UE 10 and/or in the gateway 26, the policy controller 30 and/or the filter generator 35 of the policy controller 30 could be omitted. In some embodiments, the UL and/or DL packet filters could also be preconfigured in the policy controller 30 and be signaled to the gateway 26 and/or to the UE 10, e.g., when the UE 10 attaches to the gateway 26 or when the corresponding bearer 52, 54 is established.

In the following, concepts according to embodiments of the invention will be explained, which allow for efficiently subjecting the data traffic related to one or more specific network resources to adaptive handling. In this respect, the term "network resource" is intended to cover various types of structures, content, or services which are accessible in the network. In some example, the network resource may be a server on which the service or content is hosted, e.g., under a Uniform Resource Identifier (URI) or Uniform Resource Locator (URL). In some scenarios, the same server may host different network resources. In the example of FIG. 1, these concepts are applied with respect providing a certain QoS level, which is achieved by routing the data packets to the bearers 52, 54 using the packet filters 62, 64, 72, 74 in the UE 10 and in the gateway 26.

The adaptive handling is accomplished on the basis of packet classification rules, which are applied by one or more communication devices, which in the example of FIG. 1 are the UE 10 and the gateway 26. In the example of FIG. 1, packet classification rules are implemented by the packet filters 62, 64, 72, 74. The packet filters 62, 64, 72, 74 are generally configured to operate on the basis of network addresses, which are included in a respective protocol header of the data packets. The network addresses may in particular be IP addresses. For example, when using the Transport Control Protocol (TCP) or the User Datagram Protocol (UDP) for implementing transport of data via the data packets, the protocol header will include IP addresses defining a source network address and a destination network address of the data packet, which can be used separately or in combination as a basis for matching a filter pattern defined in the packet filter 62, 64, 72, 74. Moreover, the above examples of a protocol header will also define a source port number and a destination port number, which can be used separately or in combination as a basis for matching a filter pattern defined in the packet filter 62, 64, 72, 74. In some embodiments, the packet filters 62, 64, 72, 74 may operate on the basis of a pattern for matching an IP-5 tuple (source IP address, destination IP address, source port number, destination port number, protocol ID of the protocol above IP) of the data packets. Further, the packet filters may operate on a filter pattern in which an IP address is be combined with a prefix mask, and/or port numbers are be specified as port ranges. The filter pattern can also be extended by the Type of Service (TOS) (IPv4)/Traffic class (IPv6) and Mask. The filter pattern can also consist of the destination IP address, protocol ID of the protocol above IP, the Type of Service (TOS) (IP Version 4)/Traffic class (IP Version 6) and Mask and the IPSec Security Parameter Index (SPI). The filter pattern can also consist of the destination IP address, the Type of Service (TOS) (IPv4)/Traffic class (IPv6) and Mask and the Flow Label (IPv6). In some embodiments, a value left unspecified in the filter pattern packet filter 62, 64, 72, 74 may match any value of the corresponding information in the data packet, i.e., wildcards may be defined.

In order to reduce complexity of the packet classification rules needed to implement the desired adaptive handling, i.e., of the packet filters 62, 64, 72, 74, the concepts according to embodiments of the invention as explained in the following are based on an adaptation of lookup procedures for obtaining network addresses of the specific network resources for which adaptive handling is implemented. This adaptation is accomplished by processing one or more messages of the lookup procedure. In the illustrated examples, the lookup procedures are based on the Domain Name System (DNS), and the adaptation is accomplished by processing one or more DNS messages, e.g., a DNS query or a response to a DNS query. In other examples, other lookup procedures could be used as well, e.g., a NetBIOS lookup procedure.

This processing may involve redirecting a query for the network address of the network resource. The processing is based on mobile access information of or related to a connection of the UE 10 to the mobile network. The network address as returned by the adapted lookup procedure may be selected depending on the mobile access information. The mobile access information includes information which is accessible to the mobile network or can be provided by the mobile network. In the mobile network, the mobile access information can be used for establishing, controlling, and/or maintaining the connection to the UE 10. For example, such information may be a mobile network subscriber identifier used by the UE 10 for connecting to the mobile network, e.g., an International Mobile Subscriber Identity (IMSI) or a Mobile Subscriber Integrated Services Digital Network Number (MSISDN), a hardware identifier of the UE 10, e.g., an International Mobile Equipment Identity (IMEI), a RAT identifier indicating a radio access technology used by the UE 10 for connecting to the mobile network, a mobile network gateway address of a gateway used by the UE 10 for connecting to the mobile network, e.g., a Serving Gateway Support Node (SGSN) address, and/or a location of the user equipment, e.g., in terms of a mobile network cell to which the UE 10 is connected or in terms of geographical coordinates.

More specifically, the illustrated concepts apply to scenarios in which data traffic related to a specific network resource is enabled by a lookup procedure for obtaining a network address of this network resource. The lookup procedure is adapted by processing of one or more messages of the lookup procedure in such a way that the lookup procedure returns a network address network resource capable of handling the data traffic, e.g., by sending requested data or storing uploaded data. For example, the network resource may be configured with this capability by operating as a proxy node with respect to the network resource. The network resource may also cache content provided by the network resource. In some embodiments, the network resource may be a cache server or a tunnel edge server for delivering the content of the network resource. The network resource may also be mentioned as a replacement network resource.

In this connection, the mobile access information allows for determining the network resource depending on the particular circumstances of establishing the connection to the mobile network. For example, different types of network resources could be provided, e.g., a cache and a tunnel edge server, and the adaptation of the lookup procedure could be used to select between these different types of network resources. Also, the adaptation of the lookup procedure could be used to select whether a certain network resource is used or not. For example, the adaptation of the lookup procedure could be used to select that the data traffic of one type of UE, e.g., as identified by its IMEI, is transferred through a cache, while the data traffic of another type of UE, e.g., as identified by its IMEI, is transferred directly. In the latter case, the lookup procedure could be adapted to return a network address directly corresponding to the network resource.

If the lookup procedure returns the network address of the network resource, communication of data packets may be established with respect to the network resource, and adaptive handling of the data packets may be accomplished on the basis of the network address of the network resource, i.e., by using packet filters matching the network address of the network resource. Accordingly, the adaptive handling of the data packets can be facilitated by suitably selecting the network address of the network resource. For this purpose, the network resource may be located in the same local network as communication device, e.g., the UE 10, to which the communication is established. A network operator of the local network may therefore suitably assign the network address to the network resource. For example, the network address may be selected from a private network address range, e.g., as defined in RFC 1918, RFC 4193, or RFC 5735. However, the network address could also be selected from a specific range of public network addresses, e.g., allocated to the network operator.

For example, the network address of the network resource may be selected from a network address range corresponding to a subnet. In this case, the packet classification rule operating on the basis of this network address may be provided with a simple structure. For example, the filter pattern as used by one or more of the packet filters 62, 64, 72, 74 may define the network address to be matched by using a wildcard, thereby achieving that every network address within this subnet will match the filter pattern. As can be seen, it is therefore possible to efficiently define a packet classification rule to provide the same handling for all network addresses from this subnet. This could be used to provide a specific handling for a number of specific network resources by assigning the network resources for these network resources network addresses from the same subnet. According to a further example, also differentiation between the data traffic of different network resources can be implemented by selecting the network addresses of the corresponding network resources each from a different network range corresponding to a subnet. A corresponding packet classification rule may be defined for each subnet, thereby allowing to individually define a corresponding handling of the related data traffic. Accordingly, in some embodiments the network address of the network address can be selected in accordance with a traffic class of the data traffic related to the network resource. In particular, each traffic class may be assigned to a corresponding network address range, e.g., a subnet, and the network address of the network resource may be selected from the network address range corresponding to the traffic class of the data traffic related to the network resource.

In order to implement the above concepts, the mobile network environment of FIG. 1 further includes a lookup adaptation server (LAS) 100. In addition, a lookup adaptation controller (LAC) 200 may be provided. Typically, the lookup adaptation server 100 will receive lookup messages pertaining to the data traffic related to the specific network resource. In some embodiments, the lookup adaptation server 100 may be arranged in such a way that lookup messages pertaining to the data traffic of the UE 10 are routed through the lookup adaptation server 100. For example, this could be accomplished by arranging the lookup adaptation server 100 in a data path between the gateway 26 and a local DNS server (not illustrated in FIG. 1). Similarly, the lookup messages may be routed through the lookup adaptation controller 200. In some embodiments the lookup adaptation server 100 may be part of the gateway 26. In some embodiments, the lookup adaptation server 100 could also be part of the local DNS server. According to still further embodiments, the lookup adaptation server could also be arranged in a data path between the local DNS server and an external DNS server. Further, in some embodiments the lookup adaptation server 100 may also be part of an external DNS server, i.e., located outside the mobile network. The lookup adaptation server 100 may be implemented within other network devices, e.g., the gateway 26 or the local DNS server, or as a standalone network device. The functionalities of the lookup adaptation server 100 may be implemented by software by having a processor (not illustrated in FIG. 1) of the lookup adaptation server 100 execute suitably configured program code and use suitably configured lookup adaptation data. As an alternative, the lookup adaptation server 100 may at least in part be implemented by dedicated hardware. The lookup adaptation controller 200 may be used to provide at least a part of the lookup adaptation data to the lookup adaptation server 100. In particular, the lookup adaptation controller 200 may be used to provide the mobile access information to the lookup adaptation server 100. This may in particular be useful in scenarios where the lookup adaptation server 100 is located outside the mobile network, e.g., is implemented in an external DNS server. The lookup adaptation controller 200 could in turn be provided inside the mobile network, e.g., within the core network. Alternatively, the lookup adaptation controller 200 could be located outside the mobile network, but with access to certain information within the mobile network, e.g., by being provided with access to control signaling in the mobile network, such as authentication messages.

In some embodiments, the network address of the network resource may be selected in such a way that it matches a preconfigured packet classification rule operating on the basis of this network address. In this way, no individual procedures for generating and/or signaling the packet classification rules are necessary. For example, in the mobile communication network environment of FIG. 1, the packet filters 62, 64 could be preconfigured in the UE 10, and/or the packet filters 72, 74 could be preconfigured in the gateway 26. Also, the packet filters 62, 64 could be preconfigured in the gateway 26 and then signaled to the UE 10. Further, the packet filters 62, 64, 72, 74 could be preconfigured in the policy controller 30 and the be signaled to the gateway 26 and/or to the UE 10. The preconfiguration could be obtained, e.g., by providing the packet classification rules together with an operating software of the communication device which is to perform adaptive handling on the basis of these packet classification rules, or by using maintenance procedures to provide the packet classification rules to the communication device. In some embodiments such preconfigured packet classification rules may be updated in response to inspecting the data packets, thereby allowing for a refined differentiation, e.g., between different classes of data traffic related to the same network resource or between data traffic related to different network resources using the same network resource.

In some embodiments, a packet classification rule operating on the basis of the network address of the network resource may also be dynamically generated in response to selecting the network address of the network resource, or an existing packet classification rule may be modified in response to selecting the network address of the network resource. In the example of FIG. 1, the lookup adaptation controller 200 may use the signaling path 5 to the policy controller 30 to initiate generation of new packet filters to be used by the UE 10 and/or by the gateway 26 or to initiate modification of the existing packet filters 62, 64, 72, 74, which in each case may be accomplished by the filter generator 35 of the policy controller 30.

Figure 2:
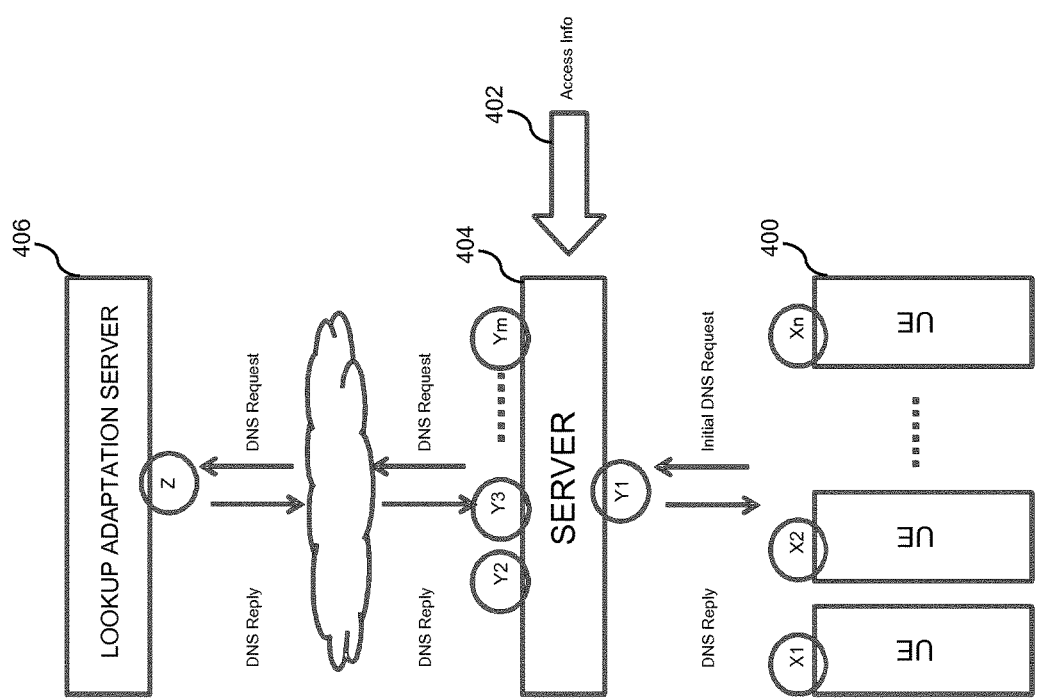
FIG. 2 shows an architectural diagram for implementing the proposed method.

FIG. 2 shows an architectural diagram for implementing the proposed method. The basic idea described in the embodiment shown in FIG. 2 is to make the server 404 aware of the characteristics related to a connection of the user equipment 400 to the communications network where it is the user equipment 400 from where the initial DNS request originates. The server 404 can also be referred to as local DNS access server. The DNS request is then forwarded towards the Lookup Adaptation Server 406 (or else called DNS resolver) from an IP address selected by the server based upon the access information 402. The DNS request (which can be referred to as a further request) is different from the initial DNS request in the sense that it has a different source IP address as will be explained in more detail below.

The access information 402 is acquired e.g. by the server 404 getting RADIUS accounting information from a GGSN/PGW. This can be done explicitly or implicitly by sniffing i.e. intercepting messages and read their content. Another way of acquiring the access information is by the server getting a copy of the Gx session signaling.

The access information may include a network subscriber identifier used by the UE 400 for connecting to the network, e.g., an IMSI or MSISDN, a hardware identifier of the UE, e.g., an IMEI, a RAT identifier indicating a RAT used by the UE for connecting to the network, a network gateway address of a gateway used by the UE for connecting to the network, e.g., an SGSN address, and/or a location of the UE, e.g., in terms of a network cell to which the UE is connected. The access information may also include other information used in the network for establishing or maintaining the connection to the UE. The access information may for example originate from one or more authentication messages transmitted within the network.

Different policies are conceivable for selecting the IP address for the DNS request. This IP address can be considered a source IP address for the DNS request. There can be a distinction between static and dynamic policies. Static policies would be based on e.g. terminal/subscriber specific information that does not change over the life time of a Gx session. The Gx session can be considered the session during which the user equipment or terminal is connected to the communications network. For example, for terminals from IMSI group A the DNS request should have the source IP address Y2, for terminals from IMSI group B the DNS request should have the source IP address Y3, etc. The same logic would apply when using the IMEI for selecting the IP address.

On the other hand, dynamic policies would be based on terminal/subscriber specific information that can change over the life time of a Gx session. For example, for terminals currently camping on RAT-Type "LTE" the DNS request could have the source IP address Y4. For terminals currently camping on RAT-Type "3G" the DNS request could have the source IP address Y5, etc. Furthermore dependencies which relate to the 'time of the day' and/or 'the day of week' may also be used as policies. Similarly the location (cell-id, SGSN-id, routing-area, etc.) of the UE/terminal can be taken into account for selecting the IP address of the DNS request. Finally combinations of the static and/or dynamic policies described above are conceivable for selecting the IP address of the DNS request.

Figure 3:
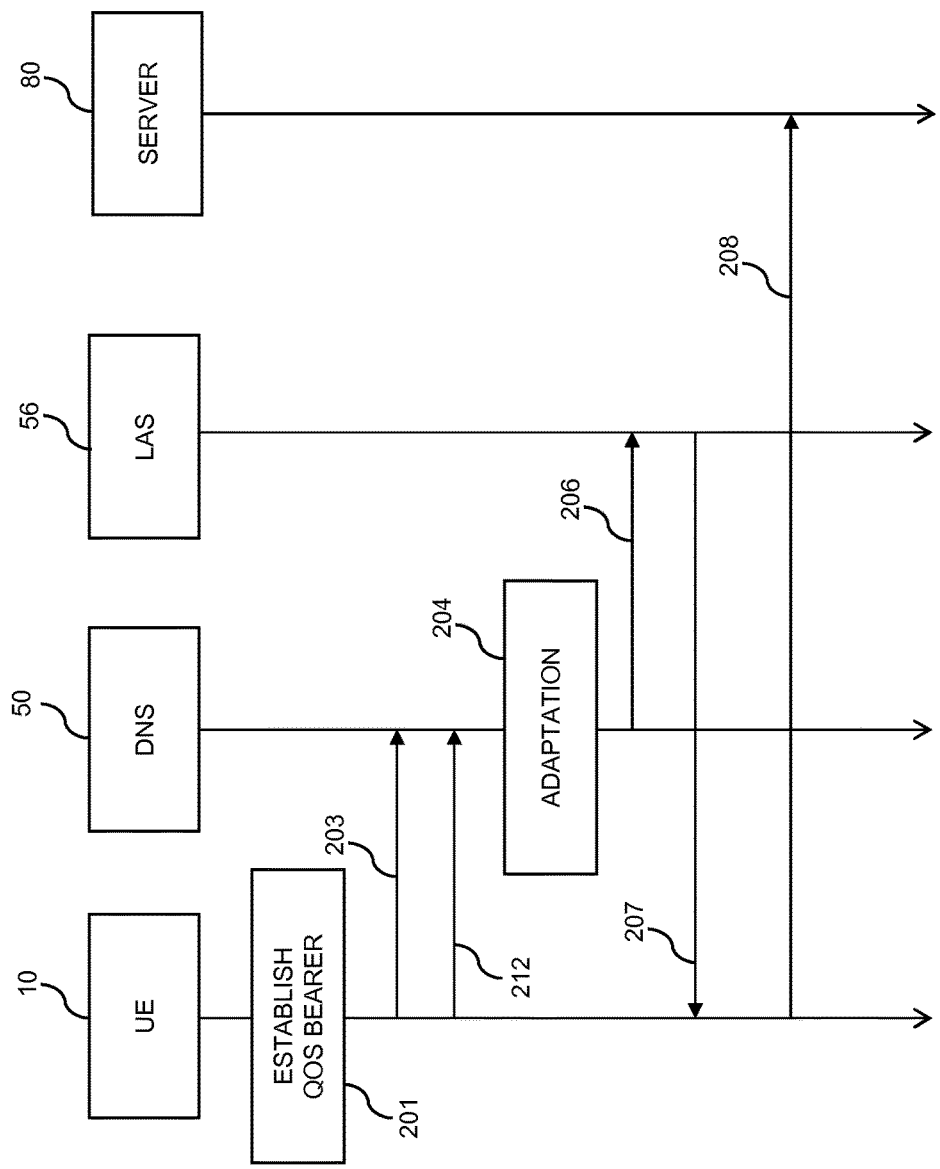
FIG. 3 shows signaling diagram for illustrating an exemplary scenario in which adaptive handling of data traffic is provided.

FIG. 3 shows a signaling diagram for illustrating an exemplary scenario in which adaptive handling of data traffic is provided by adapting a lookup procedure in accordance with the above concepts. The signaling diagram of FIG. 3 shows the UE 10, a local DNS server 50, a lookup adaptation server 55, and a server 80.

In the scenario of FIG. 3, the server 80 represents an example of a specific network resource for which the related data traffic is to be subjected to adaptive handling in communication with respect to the UE 10. For example, the server 80 may provide one or more specific internet service or may be part of a content delivery system used for efficient delivery of content. As explained in connection with FIG. 1, this adaptive handling may have the purpose of providing a certain QoS level for the data traffic, which can be obtained by routing data packets of this data traffic to a corresponding bearer, e.g., one of the bearers 52, 54, in particular the dedicated bearer 54.

It is assumed that the UE 10 is attached to a mobile network using a certain RAT type, e.g., as illustrated in FIG. 1, and that the local DNS server 50 is part of this mobile network, i.e., controlled by the same network operator. At step 201, a bearer to be used by the data traffic related to the server 80 is established, e.g., the dedicated bearer 54. The bearer may be established to offer a certain QoS level, thereby allowing to treat the data traffic, e.g., as premium traffic or trash traffic. The bearer may already be established when the UE 10 attaches to the mobile communication network. Alternatively, the bearer could also be established in response to first detecting the data traffic related to the server 80. The packet filters to be used for routing the data traffic to the bearer are configured to operate on the basis of the network address assigned to the server 60. In particular, the UL packet filters to be used in the UE 10 are configured to route UL data packets directed to the network address of the server to the bearer, and the DL packet filters to be used in the gateway to which the UE 10 is attached, e.g., the gateway 26 of FIG. 1, are configured to route DL data packets coming from the network address of the server to the bearer. The packet filters may be preconfigured in the UE 10 or in the gateway.

When the UE 10 now needs to access the server 80, it first issues a DNS query 203 to the local DNS server 50. The DNS query 203 specifies a hostname or URI associated with the server 80 to request the network address of the server 80. Access information of the UE is provided 212 to the local DNS server. This information can be provided by the UE itself (as shown in the figure) or by another entity in the network. The local DNS server 50 then performs an adaptation step 204. The adaptation step 204 is performed on the basis of the access information of the connection between the UE 10 and the mobile network, e.g., an IMEI of the UE 10. The adaptation step defines the source IP address for the DNS query. This query is sent 206 to the lookup adaptation server 56.

The lookup adaptation server 56 returns 207 the network address of the network resource or server 80. The UE 10 can use this information to access 208 server 80. In this way the UE can have access to data traffic which can be server by the server 80.

Figure 4:
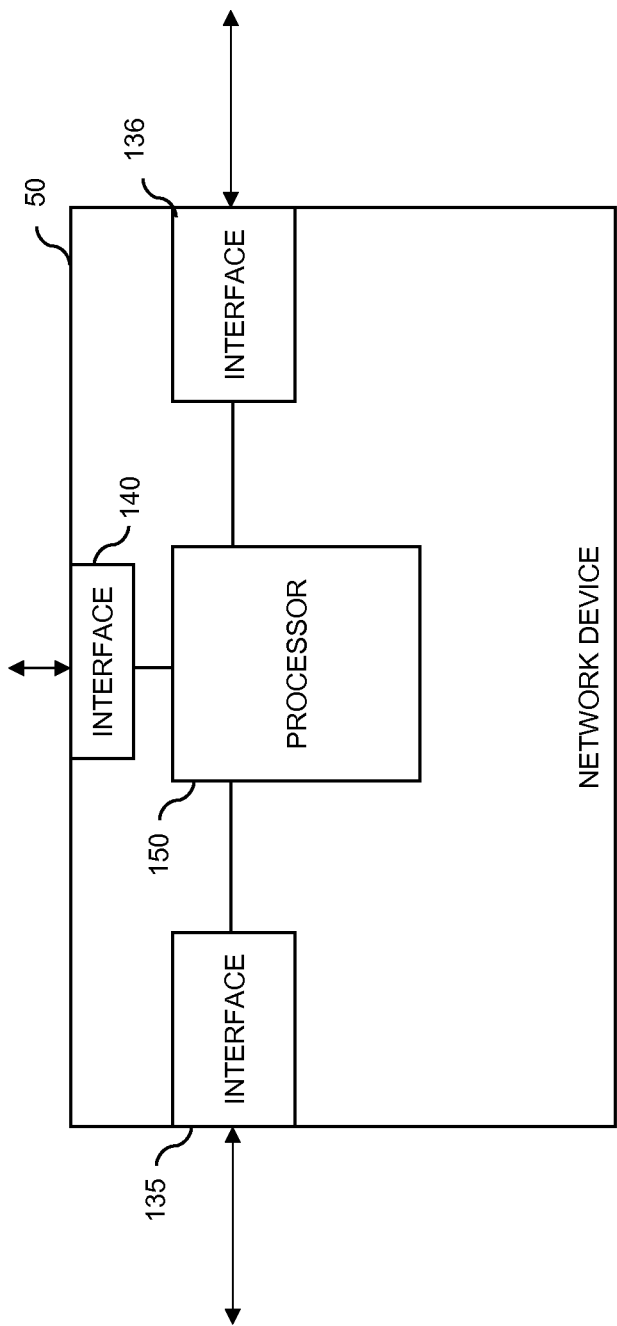
FIG. 4 shows a network device for adaptive handling of network data traffic between a user equipment and a network resource in a communications network.

FIG. 4 shows a network device 50 for adaptive handling of network data traffic between a user equipment 10 and a network resource 80 in a communications network. The device comprises an interface 130 for receiving a request for accessing data traffic by the user equipment. The interface 130 can be further adapted to receive DNS queries or responses to DNS queries. The device also comprises a processor 150. The processor is adapted to obtain or access information which is related to how the user equipment 10 is connected to the communications network. This information can be obtained or accessed by the processor over interface 136. Further the processor is adapted to send a request (also referred to as a further request) to a lookup adaptation server. The source address of this request is based on the access information of the user equipment which has been obtained or accessed by the processor. This request can be sent over interface 140. Finally the processor is adapted to receive by the lookup adaptation server a network address of a network resource capable of handling the data traffic. The network address of the network resource is dependent on the source address of the request that the processor has sent to the lookup adaptation server.

It is to be understood that the structure as illustrated in FIG. 4 is merely schematic and that the network device 50 may include further components which, for the sake of clarity, have not been illustrated, e.g., further interfaces. According to some embodiments, also a computer program product may be provided for implementing concepts according to embodiments of the invention, e.g., a computer-readable medium storing the program code. As can be seen, by using the above described concepts, adaptive handling of data traffic related to one or more specific network resources can be implemented in a very efficient manner. In particular, the adaptation of the lookup procedure can be performed to take into account specific aspects relating to the connection between the UE and the mobile network, e.g., type of UE, identity of the mobile network subscriber, or the like, in order to achieve a smart decision in which way the lookup procedure should be adapted.

It is to be understood that the examples and embodiments as explained above are merely illustrative and susceptible to various modifications. For example, the concepts could be used in other types of mobile network. Also, the actual location of performing the adaptation of the lookup procedure and/or obtaining the mobile access information could be modified. Further, the mobile access information could be obtained from a plurality of different sources.

Further, it is to be understood that the above concepts may be implemented by using correspondingly designed software in existing network devices, or by using dedicated network device hardware.

The invention claimed is:

1. A method in a communications network for adaptive handling of network data traffic between a user equipment and a network resource, said data traffic being enabled by a lookup procedure for obtaining a network address of the network resource, the method comprising:
   receiving by a server, from the user equipment a request for accessing said data traffic;
   obtaining by said server, access information related to a connection of the user equipment to the communications network;
   sending a further request by the server to a lookup adaptation server, wherein the further request includes a source address that corresponds to the user equipment and that is based on the access information; and
   based on the source address of the further request, returning by the lookup adaptation server to the user equipment the network address of the network resource configured to handle the data traffic,
   wherein the access information comprises at least one element of a group comprising a network subscriber identifier used by the user equipment for connecting to the network, a hardware identifier of the user equipment, an access technology identifier indicating an access technology used by the user equipment for connecting to the network, a network gateway address of a gateway used by the user equipment for connecting to the network, and a location of the user equipment.

2. The method according to claim 1, wherein said access information is static throughout a time of the connection of the user equipment to the communications network.

3. The method according to claim 1, wherein said access information is dynamic throughout a time of the connection of the user equipment to the communications network.

4. The method according to claim 1, wherein the network resource comprises a cache server.

5. The method according to claim 1,
   wherein the access information related to a connection of the user equipment to the communications network is used by the server to determine the source address of the further request, and
   wherein the lookup adaptation server returns, to the user equipment, based on the source address of the further request, the network address of the network resource configured to handle the data traffic.

6. A network device for adaptive handling of network data traffic between a user equipment and a network resource, in a communications network, the network device comprising:
   an interface configured to receive a request for accessing the data traffic; and
   a processor configured to perform operations comprising:
      receiving access information related to a connection of the user equipment to the communications network;
      sending a further request to a lookup adaptation server, wherein the further request includes a source address that corresponds to the user equipment and that is based on the access information; and
      based on the source address of the further request, receiving from the lookup adaptation server a network address of the network resource configured to handle the data traffic,
   wherein the access information comprises at least one element of a group comprising a network subscriber identifier used by the user equipment for connecting to the network, a hardware identifier of the user equipment, an access technology identifier indicating an access technology used by the user equipment for connecting to the network, a network gateway address of a gateway used by the user equipment for connecting to the network, and a location of the user equipment.

7. The network device according to claim 6,
   wherein the access information related to a connection of the user equipment to the communications network is used by the network device to determine the source address of the further request, and
   wherein the lookup adaptation server returns, via the network device and to the user equipment, based on the source address of the further request, the network address of the network resource configured to handle the data traffic.

8. A network system for enabling adaptive handling of network data traffic between a user equipment and a network resource in a communications network, said data traffic being enabled by a lookup procedure for obtaining a network address of the network resource, the network system comprising:
   at least one communication device comprising a packet filter for directing the data traffic to a bearer; and
   a network device configured to perform operations comprising:
      receiving a request for accessing the data traffic, receiving access information related to a connection of the user equipment to the communications network, sending a further request to a lookup adaptation server, wherein the further request includes a source address that corresponds to the user equipment and that is based on the access information, and based on the source address of the further request, receiving from the lookup adaptation server the network address of the network resource configured to handle the data traffic, wherein the access information comprises at least one element of a group comprising a network subscriber identifier used by the user equipment for connecting to the network, a hardware identifier of the user equipment, an access technology identifier indicating an access technology used by the user equipment for connecting to the network, a network gateway address of a gateway used by the user equipment for connecting to the network, and a location of the user equipment.

9. The network system according to claim 8, wherein the access information related to a connection of the user equipment to the communications network is used to determine the source address of the further request, and wherein the lookup adaptation server returns, via the network system and to the user equipment, based on the source address of the further request, the network address of the network resource configured to handle the data traffic.

10. A computer program product comprising a non-transitory computer readable medium storing program code to be executed by a processor of a network device to cause the network device to operate according to the method of claim 1.

* * * * *